US011263621B2

(12) United States Patent
Sarin

(10) Patent No.: US 11,263,621 B2
(45) Date of Patent: Mar. 1, 2022

(54) PARENT LEVEL TOKEN ISSUANCE FOR ASYNCHRONOUS DATA PROCESSING BASED ON DEVICE TRUST LEVELS

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 275 days.

(21) Appl. No.: 16/234,414

(22) Filed: Dec. 27, 2018

(65) Prior Publication Data

US 2020/0210997 A1     Jul. 2, 2020

(51) Int. Cl.
  *G06Q 20/00*   (2012.01)
  *G06Q 20/36*   (2012.01)
  *G06Q 20/22*   (2012.01)
  *H04L 9/32*    (2006.01)

(52) U.S. Cl.
  CPC ....... *G06Q 20/3674* (2013.01); *G06Q 20/223* (2013.01); *H04L 9/3213* (2013.01)

(58) Field of Classification Search
  CPC ............ G06Q 20/3674; G06Q 20/223; G06Q 20/3821; G06Q 20/2295; H04L 9/3213; H04L 2209/56
  See application file for complete search history.

(56) References Cited

U.S. PATENT DOCUMENTS

| | | | |
|---|---|---|---|
| 10,002,346 B1 * | 6/2018 | Brennan | ............ G06Q 20/1085 |
| 2008/0086764 A1 | 4/2008 | Kulkarni et al. | |
| 2013/0117747 A1 * | 5/2013 | Balko | ............ G06F 9/485 |
| | | | 718/100 |
| 2016/0142323 A1 | 5/2016 | Lehmann et al. | |
| 2017/0262841 A1 | 9/2017 | Good et al. | |
| 2017/0270528 A1 | 9/2017 | Prakash et al. | |
| 2018/0268382 A1 | 9/2018 | Wasserman | |

OTHER PUBLICATIONS

Liu et al. "hiREP: Hierarchical Reputation Management for Peer-to-Peer Systems," 2006 International Conference on Parallel Processing (ICPP'06), 2006, pp. 289-296. Retrieved on Sep. 4, 2020. Retrieved from<https://ieeexplore.ieee.org/abstract/document/1690631 > entire document.

International Search Report and Written Opinion, PCT/US19/68829, dated Apr. 29, 2020, 29 pages.

International Application No. PCT/US2019/068829, International Preliminary Report on Patentability dated Jul. 8, 2021, 8 pages.

* cited by examiner

*Primary Examiner* — Dante Ravetti
(74) *Attorney, Agent, or Firm* — Haynes and Boone, LLP

(57) ABSTRACT

There are provided systems and methods for parent level token issuance for asynchronous data processing based on device trust levels. Two devices may interact enough that they develop a trust rating between the two devices that the devices are trusted for transaction processing and resolution. In order to provide asynchronous transaction processing without requiring a token service provider or transaction processor, a parent level token may be issued to the devices by a token service provider based on the trust rating. The devices may receive child level tokens from the parent token, while the parent token is stored by the transaction processor. The child level tokens may allow the devices and transaction processor to trust the devices to process and resolve transaction processing without availing the token service provider for token issuance.

20 Claims, 5 Drawing Sheets

PARENT LEVEL TOKEN ISSUANCE FOR ASYNCHRONOUS DATA PROCESSING BASED ON DEVICE TRUST LEVELS

TECHNICAL FIELD

The present application generally relates to tokenization of data during data processing of sensitive data, and more specifically to issuance of parent level tokens based on device-to-device trust levels that allows for asynchronous processing of data.

BACKGROUND

Users may utilize computing devices to perform electronic transaction processing with other devices, such as merchant devices at a merchant location or with other users to make purchases, access content, or transfer money. In order to secure sensitive data during transaction processing, a token may be issued for that data, where the token does not reveal the sensitive data. This backend tokenization process allows for retrieval of the sensitive data during transaction processing but does not allow for bad actors to determine the data from the token itself. However, these processes require a token service provider to be availed and issue a token for each individual transaction processing, which requires time and introduces latency, especially if network communications with the token service provider are unavailable. Additionally, this introduces additional processing requirements for a transaction processor, each individual device, and the token service provider. Thus, additional processing time and requirements are introduced, and network resources are consumed, which affect operability of each device or server on a network.

Figure 1:
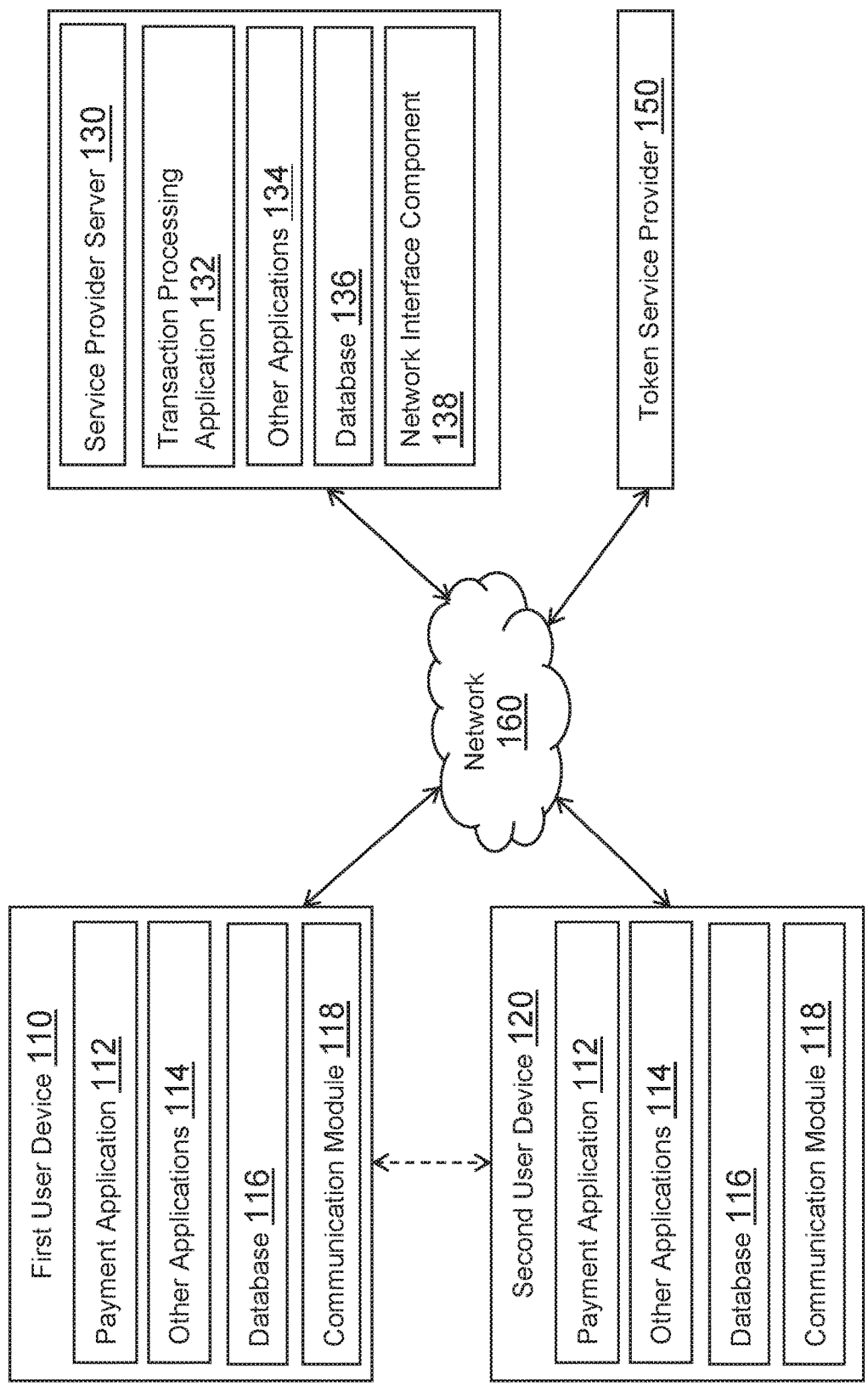
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for parent level token issuance for asynchronous data processing based on device trust levels. Systems suitable for practicing methods of the present disclosure are also provided.

Tokenization of sensitive data, such as identity, financial, and/or funding source information, may be utilized in order to protect the data from bad actors and unwanted disclosure of the data to other parties. Tokenization may be implemented by substituting the sensitive data for a known identifier or data token, such as an alphanumeric code or other data representation, by a token service provider, where the token service provider may provide the token for use during data or transaction processing to represent the associated data. The token service provider and/or another transaction processor may process the tokenized data through referential databases by utilizing trusted communications to detokenize the token when received. The referential databases may be used to look up the sensitive data through secure communications so that the data is not disclosed when the token is exchanged between parties. However, this requires the token service provider and the transaction processor to process the data, issue tokens, and communicate, which introduces additional processing time and requires processing availability and network bandwidth to perform such communications. Thus, the token service provider and/or transaction processor may issue tokens prior to data processing to reduce immediate processing requirements and perform asynchronous data processing that does not require the token service provider to be availed to issue tokens at the time of transaction processing. This may result in faster data processing at the time that the token is utilized and reduce processing requirements when multiple transactions are requested.

In order to issue a token to devices for trusted data prior to data processing, a trust level or score may be determined in order to ensure that both devices interacting can be trusted to resolve the data processing based on the token. For example, two or more parties may interact consistently over a period of time using the same devices. These parties may utilize the devices to transfer money and/or pay each other using a payment application on the devices. Thus, data of interactions between the devices may correspond to account data for one or more accounts of the users that interact. The account data may include one or more transaction histories for the users, which documents payments and transfers made between the parties. The data may also correspond to past disputes and/or transaction resolution between the parties. In some embodiments, the data may also correspond to known connections between the parties, such as a social affinity determination based on friends, family members, shared contacts, etc.

In some embodiments, the interactions between the devices may be tracked through electronic communications, messages, and/or data exchanges between the devices. The data may also correspond to shared locations between the users and/or the devices of the users, such as shared geo-locations detected by the devices and/or detecting the device within the same geo-fenced area. The data may include shared identifiers and/or other information used to communication between devices, such as contact information from a contact list application. In other embodiments, other data may be used to determine that the devices have interacted in the past, and the users are trusted users of each other, such as social networking connections or other online interactions between the users. This data may be stored by the devices and retrievable by a transaction processor that store the token issued to the devices, or may be stored by the transaction processor or another online resource.

Once data of interactions between the users and/or device is determined, a transaction processor may determine a trust score or level for the interactions between the devices. The trust score may be used to determine whether the users and their corresponding devices are trusted to interact and resolve transaction processing. The trust score may be calculated based on the interaction data between the user and/or their corresponding devices, and may correspond to a measurement of trust that determines whether a token can be issued to the users to resolve transaction processing without requiring the user's devices to avail a token service provider at the time of transaction processing for a token. Thus, the transaction processor may determine the trust score in order to determine whether to request issuance of a token for transaction processing between the devices prior to initiation of the transaction processing. The threshold ranking or score to issue the token may be set by the transaction processor and if the determined trust score meets or exceeds the threshold level, the transaction processor may engage the token service provider to issue a token used for transaction processing.

The token service provider may receive a request to issue a first level token, a "parent" level token, or a "parent" token that is used to resolve transaction processing between the devices. The parent token may be fetched from the token service provider's token vault and may be used to tokenize data necessary for electronic transaction processing between the users. For example, the data tokenized using the parent level token issued by the token service provider may correspond to payment data, including financial data, payment card data, and/or account data for one or more payment accounts of the users used for electronic transaction processing. The token may also be used to identify the devices and/or users so that the token may be used to later resolve transaction processing using data that may be retrieved from the devices or accessible from an online resource. When issuing the parent level token, the token service provider may issue the token with rules or limitations on use. For example, the token may also be generated for a maximum amount allowed for transaction processing based on risk rules for the transaction processor and/or financial information. For example, a funding source may have a maximum amount allowed for transaction processing or may be limited based on the user's transaction history or funding source provider's risk rules. The token may also be limited based on a predicted amount for a transaction between the users. The token may also be limited geographically to an area associated with the users interacting and/or device locations. The predicted amount may be based on previous user purchases and/or transfers between the user(s). In some embodiments, multiple different funding sources may be tokenized, each with a corresponding maximum amount, time, and/or geographic limit based on the user's preferences, available rewards, balances, and/or loyalty information. The token may be valid for an amount of time. The token may also be generated with other limitations, including devices using the token and/or transactions with which the token may be used for processing.

The parent level token may then be stored by the transaction processor or other service provider that requests issuance of the token. The token service provider and/or transaction processor may then issue second level tokens, "child," or "child" level tokens from the parent level token, where the child level tokens are generated based on the parent level token and allows for determination of the parent level token when received by the transaction processor. The child level token may be issued to one or more of the users' devices and may be stored locally so that when the users interact, the child level token may be exchanged and used to determine the parent level token on the transaction processor. The child level token may be stored on the device that generally pays or transfers money to the other device or may be stored on each user's device so that either user may engage the other user in transaction processing through an application on the device. The child level tokens may also be associated with a trust rating so that when the child level token is received by the other device, the device may know that the other device is trusted for transaction processing. In this regard, when one of the user's device interacts with the other user's device, the token may be exchanged and an application on the device may immediately trust the other device for electronic transaction processing and resolution. For example, the child level token may be received and the application may immediately approve the transaction and/or display authorization of the transaction, where the transaction may later be resolved asynchronously with the transaction processor and a payment or transfer between the parties may later be resolved. This may occur where network communications are unavailable, latency with the transaction processor prevents immediate transaction processing, and/or a server load of the transaction processor exceeds a limit so that transaction processing is unavailable.

After initiation of transaction processing between the devices, the transaction data and the child level token may be transmitted to the transaction processor by the device processing the transaction and requesting a payment, access, or transfer. The transaction processor may utilize the parent level token to process the transaction, which may be performed without requiring the transaction processor to avail the token service provider for issuance of a token for sensitive data in the transaction. Thus, when a transaction is processed, the transaction processor may utilize the parent level token stored by the transaction processor instead of being required to route the request to the token service provider and have a token issued from the token service provider for sensitive data. The transaction processor may determine if the transaction is valid and the terms of the transaction are within the rules set for the token. Additionally, the transaction processing may check business rules when approving the transaction with the devices. Later, such as asynchronously after approving the transaction with the devices, the transaction processor may process the transaction with the token service provider by routing the details to the token service provider when load balancing is performed. Thus, if the rules and terms are valid, the transaction may be processed using the parent level token. The devices of the users may then receive results of the transaction processing, which may be displayed to the users to confirm or deny the transaction processing without requiring the token service provider at the time of transaction processing.

Thus, in this manner, a transaction processor may provide asynchronous data processing using data tokenization through issuance of a token prior to the required data processing. The transaction processor can trust that the transaction will be resolved based on a trust score determined from interactions between the devices. This allows the transaction processor to have a token service provider issue a token from its token vault for data tokenization and store the issued parent level token to reduce the risk of fraud, transaction reversal, or other transaction disputes. Additionally, user devices may store child level tokens with a trust parameter so that the tokens may be exchanged between devices and the devices may immediately resolve transaction processing based on receipt of the trusted child level token.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user device 110, a second user device 120, a service provider server 130, and a token service provider 150 in communication over a network 160. A first user (not shown) may utilize first user device 110 to interact with second user device 120, such as by being co-located, sharing contact information, and/or engaging in electronic transaction processing. Service provider server 130 may determine that first user device 110 and second user device 120 may be trusted based on their interactions, and in response, service provider server 130 may request issuance of a parent level token from token service provider 150 for electronic transaction processing between first user device 110 and second user device 120. Token service provider 150 may issue the parent level token to service provider server 130, which may store the token. Additionally, child level tokens may be issued to first user device 110 and second user device 120 for use in transaction processing.

First user device 110, second user device 120, service provider server 130, and token service provider 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First user device 110 may be implemented as a communication device that may utilize appropriate hardware and software configured for wired and/or wireless communication with second user device 120, service provider server 130, and/or token service provider 150. For example, in one embodiment, first user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First user device 110 of FIG. 1 contains a payment application 112, other applications 114, a database 116, and a communication module 118. Payment application 112 and other applications 114 may correspond to executable processes, procedures, and/or applications with associated hardware. In other embodiments, first user device 110 may include additional or different modules having specialized hardware and/or software as required.

Payment application 112 may correspond to one or more processes to execute modules and associated devices of first user device 110 to interact with second user device 120, including performance of electronic transaction processing, which may be used to generate a child token accessible by payment application 112 to process transactions with second user device 120. In this regard, payment application 112 may correspond to specialized hardware and/or software utilized by first user device 110 to first generate and/or provide interaction data to service provider server 130. The interaction data may include connections with second user device 120, locations of first user device 110 and/or second user device 120, contact data on first user device 110 (e.g., an identifier, phone number, or contact address associated with second user device 120), and/or device recognition data between first user device 110 and second user device 120. In some embodiments, the interaction data may correspond to a history or prior purchases, transfers, and/or electronic transaction processing, which may be with second user device 120 and/or associated with second user device 120 (e.g., a payment to second user device 120, a shared or split bill with second user device 120, etc.). Payment application 112 may correspond to a general browser application configured to retrieve, present, and communicate information over the Internet (e.g., utilize resources on the World Wide Web) or a private network. For example, payment application 112 may provide a web browser, which may send and receive information over network 160, including retrieving website information, presenting the website information to the user, and/or communicating information to the website. However, in other embodiments, payment application 112 may include a dedicated application of service provider server 130 or other entity (e.g., payment provider, etc.), which may be configured to provide services through the application.

Payment application 112 may further include processes used to perform electronic transaction processing for a payment or a transfer to second user device 120. During processing of a payment or transfer transaction, payment application 112 may be utilized to select payment instrument(s) for use in providing payment for a purchase transaction, transfer, or other financial process. As discussed herein, payment application 112 may utilize user financial information, such as a credit card, bank account, or other financial account, as a payment instrument when providing payment information, which may require tokenization. Additionally, payment application 112 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account. In some embodiments, payment application 112 may utilize a token stored in database 116 by service provider server 130 or token service provider 150 prior to initiation of transaction processing. This token may correspond to a child level token that references a parent level token stored by service provider server 130.

Payment application 112 may utilize the digital token for the payment account, digital wallet, and/or payment instruments by providing the digital token during transaction processing to identify the user's payment account, digital wallet, and/or payment instruments for payment processing, which may be encrypted and/or provided through a secure channel, to second user device 120 and/or service provider server 130. Payment application 112 may also receive transaction data elements, including a recipient (e.g., an identifier associated with second user device 120) and a transaction amount, or may provide the token to second user device 120, which may enter the transaction details. The token may limit transaction processing based on one or more rules. Payment application 112 may be utilized to view the results of payment, for example, using transaction histories, dispute resolution processes, and other post-transaction process.

In various embodiments, first user device 110 includes other applications 114 as may be desired in particular embodiments to provide features to first user device 110. For example, other applications 114 may include security applications for implementing client-side security features, programmatic client applications for interfacing with appropriate application programming interfaces (APIs) over network 160, or other types of applications. Other applications 114 may also include additional communication applications, such as email, texting, voice, and IM applications that allow a user to send and receive emails, calls, texts, and other notifications through network 160. Other applications 114 may also include other location detection applications, such as a mapping, compass, and/or GPS application, which may be used to determine a location for the user that is communicated to service provider server 130. Other applications 114 may include social networking applications and/or contact list application. Other applications 114 may generate data for interactions with second user device 120. Other applications 114 may include device interfaces and other display modules that may receive input and/or output information. For example, other applications 114 may contain software programs, executable by a processor, including a graphical user interface (GUI) configured to provide an interface to the user.

First user device 110 may further include database 116 stored in a transitory and/or non-transitory memory of first user device 110, which may store various applications and data and be utilized during execution of various modules of first user device 110. Thus, database 116 may include, for example, identifiers (IDs) such as operating system registry entries, cookies associated with payment application 112 and/or other applications 114, IDs associated with hardware of first user device 110, or other appropriate IDs, such as IDs used for payment/user/device authentication or identification. Database 116 may include interaction data with second user device 120, as well as a child level token issued to first user device 110 based on the interaction data.

First user device 110 includes at least one communication module 118 adapted to communicate with second user device 120, service provider server 130, and/or token service provider 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Second user device 120 may be implemented as a communication device that may utilize appropriate hardware and software configured for wired and/or wireless communication with first user device 110, service provider server 130, and/or token service provider 150. For example, in one embodiment, second user device 120 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second user device 120 of FIG. 1 contains a payment application 122, other applications 124, a database 126, and a communication module 128. Payment application 122 and other applications 124 may correspond to executable processes, procedures, and/or applications with associated hardware. In other embodiments, second user device 120 may include additional or different modules having specialized hardware and/or software as required.

Payment application 122 may correspond to one or more processes to execute modules and associated devices of second user device 120 to interact with first user device 110, including performance of electronic transaction processing, which may be used to generate a child token accessible by payment application 122 to process transactions with first user device 110. In this regard, payment application 122 may correspond to specialized hardware and/or software utilized by second user device 120 to first generate and/or provide interaction data to service provider server 130. The interaction data may include connections with first user device 110, locations of first user device 110 and/or second user device 120, contact data on second user device 120 (e.g., an identifier, phone number, or contact address associated with first user device 110), and/or device recognition data between first user device 110 and second user device 120. In some embodiments, the interaction data may correspond to a history or prior purchases, transfers, and/or electronic transaction processing, which may be with first user device 110 and/or associated with first user device 110 (e.g., a payment to first user device 110, a shared or split bill with first user device 110, etc.). Payment application 122 may correspond to a general browser application configured to retrieve, present, and communicate information over the Internet (e.g., utilize resources on the World Wide Web) or a private network. For example, payment application 122 may provide a web browser, which may send and receive information over network 160, including retrieving website information, presenting the website information to the user, and/or communicating information to the website. However, in other embodiments, payment application 122 may include a dedicated application of service provider server 130 or other entity (e.g., payment provider, etc.), which may be configured to provide services through the application.

Payment application 122 may further include processes used to perform electronic transaction processing for a payment or a transfer to first user device 110. During processing of a payment or transfer transaction, payment application 122 may be utilized to select payment instrument(s) for use in providing payment for a purchase transaction, transfer, or other financial process. As discussed herein, payment application 122 may utilize user financial information, such as a credit card, bank account, or other financial account, as a payment instrument when providing payment information, which may require tokenization. Additionally, payment application 122 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account. In some embodiments, payment application 122 may utilize a token stored in database 126 by service provider server 130 or token service provider 150 prior to initiation of transaction processing. This token may correspond to a child level token that references a parent level token stored by service provider server 130.

In some embodiments, payment application 122 may receive transaction information input by a user associated with second user device 120 and may generate a transaction having transaction data. In other embodiments, payment application 122 may receive the transaction data from first user device 110 or another device/server. Payment application 122 may require payment from first user device 110 through a payment token stored on first user device 110. The token may correspond to a previously issued child level token stored on first user device 110 prior to transaction generation and processing. Payment application 122 may receive the token from first user device 110 over network 160 and/or through short range wireless communications that are exchanged between first user device 110 and second user device 120. In other embodiments, payment application 122 may access the child level token from database 126 and provide the token to service provider server 130 for processing with the transaction data input to payment application 122 for processing. The token may limit transaction processing based on one or more rules. Payment application 122 may be utilized to view the results of payment, for example, using transaction histories, dispute resolution processes, and other post-transaction processes.

In various embodiments, second user device 120 includes other applications 124 as may be desired in particular embodiments to provide features to second user device 120. For example, other applications 124 may include security applications for implementing client-side security features, programmatic client applications for interfacing with appropriate application programming interfaces (APIs) over network 160, or other types of applications. Other applications 124 may also include additional communication applications, such as email, texting, voice and IM applications that allow a user to send and receive emails, calls, texts, and other notifications through network 160. Other applications 124 may also include other location detection applications, such as a mapping, compass, and/or GPS application, which may be used to determine a location for second user device 120. Other applications 124 may include social networking applications and/or contact list application. Other applications 124 may generate data for interactions with first user device 110. Other applications 124 may include device interfaces and other display modules that may receive input and/or output information. For example, other applications 124 may contain software programs, executable by a processor, including a graphical user interface (GUI) configured to provide an interface to the user.

Second user device 120 may further include database 126 stored in a transitory and/or non-transitory memory of second user device 120, which may store various applications and data and be utilized during execution of various modules of second user device 120. Thus, database 126 may include, for example, identifiers (IDs) such as operating system registry entries, cookies associated with payment application 122 and/or other applications 124, IDs associated with hardware of second user device 120, or other appropriate IDs, such as IDs used for payment/user/device authentication or identification. Database 126 may include interaction data for interactions between first user device 110 and second user device 120, as well as a received child level token based on the interaction data.

Second user device 120 includes at least one communication module 128 adapted to communicate with first user device 110, service provider server 130, and/or token service provider 150. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide transaction processing to first user device 110 and second user device 120 through parent level tokens issued prior to transaction generation. In this regard, service provider server 130 includes one or more processing applications which may be configured to interact with first user device 110, second user device 120, and/or another device/server to facilitate electronic transaction processing. In one example, service provider server 130 may be provided by PAYPAL®, Inc. of San Jose, Calif., USA. However, in other embodiments, service provider server 130 may be maintained by or include a financial service provider, social networking service, email or messaging service, media sharing service, and/or other service provider, which may provide authentication services requiring identity confirmation, for example, for the use of an account.

Service provider server 130 of FIG. 1 includes a shared token application 140, a transaction processing application 132, other applications 134, a database 136, and a network interface component 138. Shared token application 140, transaction processing application 132, and other applications 134 may correspond to executable processes, procedures, and/or applications with associated hardware. In other embodiments, service provider server 130 may include additional or different modules having specialized hardware and/or software as required.

Shared token application 140 may correspond to one or more processes to execute modules and associated specialized hardware of service provider server 130 to issue a parent level token, as well as child level tokens, to first user device 110 and/or second user device 120 prior to electronic transaction processing based on a trust level for the devices, and retrieve a parent level token for electronic transaction processing when the child level token is received with transaction data by service provider server 130. In this regard, shared token application 140 may correspond to specialized hardware and/or software to receive, detect, and/or access interaction data for interactions and associations between first user device 110 and second user device 120. In some embodiments, the interaction data may include one or more transaction histories associated with first user device 110 and second user device 120, which may be associated with an account, user, and/or funding source associated with first user device 110 and second user device 120. The transaction histories may include payments and/or transfers processed by first user device 110 and second user device 120, as well as amounts, times, and/or locations of the transactions. The interactions may therefore identify payment and transfer interactions between first user device 110 and second user device 120.

In some embodiments, other interaction data may also be determined. For example, shared locations between first user device 110 and second user device 120 may be determined, times of co-location, and length of the co-location, which may include being with a proximity range and/or within a geo-fenced area. Social networking data may be retrieved that includes shared contacts and/or messages between social networking accounts utilized by first user device 110 and second user device 120. Additionally, other messages, emails, and/or text message exchanges between first user device 110 and second user device 120 may be accessed. Contact information stored on first user device and/or second user device 120 may be accessed for determination of the connections and/or interactions between first user device 110 and second user device 120. Device recognition data used by first user device 110 and second user device 120 may be retrieved as the interaction data. A social affinity based on contacts, locations, friends, and/or family may be determined for first user device 110 and second user device 120, which may be used to determine the interaction data.

After determining the interaction data, shared token application 140 may determine a trust score between first user device 110 and second user device 120. The trust score may be determined as a level or ranking of trust between the devices, and may be required to meet or exceed a threshold level before issuance of a parent level token prior to electronic transaction processing between first user device 110 and second user device 120 may be issued. If not, then shared token application 140 may not issue the parent level token, and transaction processing may proceed by availing token service provider 150 for a token to tokenize sensitive data at the time of transaction processing (e.g., when transaction data is issued and a payment instrument is required to be tokenized so that a token may be exchanged during transaction processing and processed). However, if the trust level meets or exceeds the threshold, shared token application 140 may request token service provider 150 to issue a token for the sensitive data prior to transaction processing. Token service provider 150 may provide a token to shared token application 140, which may tokenize the sensitive data. The parent level token may be issued with one or more child level tokens that provide asynchronous transaction processing. Thus, when a child level token is received with transaction data by shared token application 140, the parent level token may be identified, and the transaction data may be processed using the parent level token asynchronously without requiring token service provider 150 to issue any tokens.

Transaction processing application 132 may correspond to one or more processes to execute modules and associated specialized hardware of service provider server 130 to process a transaction, where the transaction may include transaction data generated by first user device 110 and/or second user device 120 with a previously issued token based on a trust score for transaction processing between the devices. In this regard, transaction processing application 132 may correspond to specialized hardware and/or software used by one or more users associated with first user device 110 and/or second user device 120 to establish a payment account. In various embodiments, the financial information may include payment instrument information, such as account/card numbers and information. The account may be used to send and process payments, for example, by referring to stored financial information. The payment account may be accessed and/or used through a browser application and/or dedicated payment application executed by first user device 110 and engage in transaction processing through transaction processing application 132.

The payment account or other funding source information may be tokenized prior to transaction processing by shared token application 140, which may include storing a parent level token in database 136 after issuance by token service provider 150. In some embodiments, first user device 110 and/or second user device 120 may generate transaction data, and may communicate with transaction processing application 132 to process the transaction based on a child level token that is associated with and references the parent level token. Transaction processing application 132 may utilize the child level token stored on first user device 110 and/or second user device 120 to determine the parent level token, and may utilize that token to process the transaction data asynchronously by routing the transaction data and the parent level token to token service provider 150 at a time after approving the transaction. That is, transaction processing application 132 may immediately provide a notification and code approving the transaction based on the parent level token associated with the transaction. The parent level token may be associated with one or more rules of transaction processing using the parent level token. In some embodiments, transaction processing application 132 may determine the validity of the transaction data and may utilize one or more business rules to process the transaction. Transaction processing application 132 may process a payment using the financial information associated with the token and provide a payment to an account of the other user or merchant asynchronously from the transaction time by routing the parent level token, as well as necessary transaction data, to token service provider 150 and determining the tokenized data. Transaction processing application 132 may process the payment and may provide a transaction history to first user device 110 and/or second user device 120 for transaction authorization, approval, or denial.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing service provider server 130. In various embodiments where not provided by transaction processing application 132, other applications 134 may include connection and/or communication applications, which may be utilized to transmit communications to one or more devices.

Additionally, service provider server 130 includes database 136. Accounts in database 136 may include entity information, such as name, address, birthdate, payment/funding information, additional user financial information, and/or other desired user data. The entity may link to their respective accounts through an account, user, merchant, and/or device ID, as well as a generated token, which may be provided to second user device 120 for use. Thus, when an ID is transmitted to service provider server 130, e.g., from first user device 110 and/or second user device 120, an account belonging to the entity may be found. Database 136 may also include parent level tokens issued to devices prior to transaction processing based on trust scores determined by service provider server 130. The parent level tokens may be stored and reference tokenized financial and/or funding source information.

In various embodiments, service provider server 130 includes at least one network interface component 138 adapted to communicate with first user device 110, second user device 120, and/or token service provider 150 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Token service provider 150 may correspond to a service provider that issues tokens from a token vault, where the tokens are used to replace sensitive funding source information with a randomized identifier in order to protect the data during transmission and processing. Thus, token service provider 150 may provide generation of tokens, issuance to service provider server 130, and lifecycle of such tokens, which includes rules and other limitations of use and validity of the tokens. Token service provider 150 may be availed to issue a token for sensitive data prior to transaction processing between first user device 110 and second user device 120 so that a parent level token may be stored on service provider server 130. The parent level token may have validity rules and a lifecycle, and may be referenced using child level tokens issued to first user device 110 and second user device 120 by service provider server 130 and token service provider 150. Token service provider 150 may re-issue the parent and/or child level tokens at expiration of the tokens based on a request from service provider server 130 and a trust score for payment resolution determined by service provider server 130.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
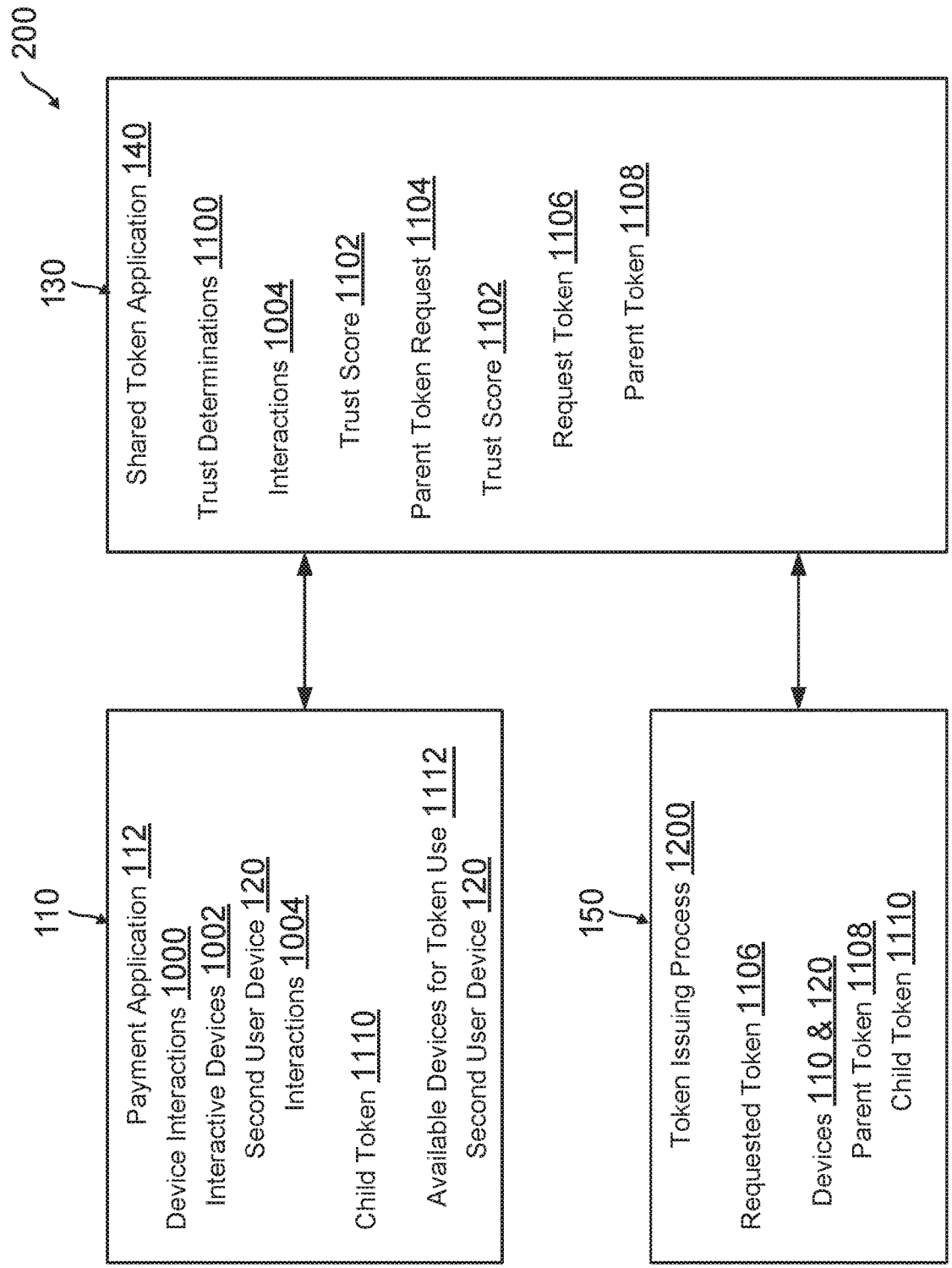
FIG. 2 is an exemplary system environment where a parent level token may be issued with issuance of child level tokens used for trusted transaction processing, according to an embodiment.

FIG. 2 is an exemplary system environment where a parent level token may be issued with issuance of child level tokens used for trusted transaction processing, according to an embodiment. Environment 200 of FIG. 2 includes a first user device 110, a service provider server 130. And token service provider 150 corresponding generally to the described devices and associated features found in system 100 of FIG. 1.

In environment 200, first user device 110 and service provider server 130 may execute modules and processes described in reference to FIG. 1. In this regard, first user device 110 may initially execute payment application 112 to perform device interactions 1000 with interactive devices 1002 including second user device 120. Device interactions 1000 may include data of interactions 1004 by first user device 110 with second user device 120, and may include previously processed transactions between first user device 110 and second user device 120, or may include other data, such as social connections, messaging, shared locations, and/or device identification and recognition data. Interactions 1004 may be tracked by first user device 110 and/or transmitted to service provider server 130 for tracking.

Service provider server 130 may utilize interactions 1004 between first user device 110 and second user device 120 with shared token application 140 to determine whether to request or provide issuance of a token prior to transaction processing between first user device 110 and second user device 120. For example, service provider server 130 executes shared token application 140 to perform trust determinations 1100 for device-to-device electronic transaction processing authorization through a parent level token. Trust determinations 1100 process interactions 1004 to determine a trust score 1102, which may be required to exceed a threshold amount or score to issue a token prior to first user device 110 and second user device 120 engaging in transaction processing. If trust score 1102 meets or exceeds the threshold, shared token application 140 may then issue a parent token request 1104 for first user device 110 and second user device 120. Parent token request 1104 may be issued based on trust score 1102 to token service provider 150.

Token service provider 150 may provide processes to generate and issue tokens for sensitive data so that the data may be tokenized for security during transmission and processing. In this regard, token issuing process 1200 may process parent token request 1104 to issue a requested token 1106. Requested token 1106 may be issued for first user device 110 and second user device 120, and may be associated with a parent token 1108, as well as child tokens 1110 from parent token 1108. Shared token application 140 may receive requested token 1106 and store parent token 1108 for later transaction processing. Additionally, child token 1110 may be transmitted to first user device 110 prior to any transaction processing so that child token is available with payment application 112. Payment application 112 may also receive data on available device(s) for token usage 1112, such as second user device 120, which may be the trusted device for processing of transactions through child token 1110. Child token 1110 may immediately authorize transactions between first user device 110 and second user device 120 based on trust determinations 1100.

Figure 3:
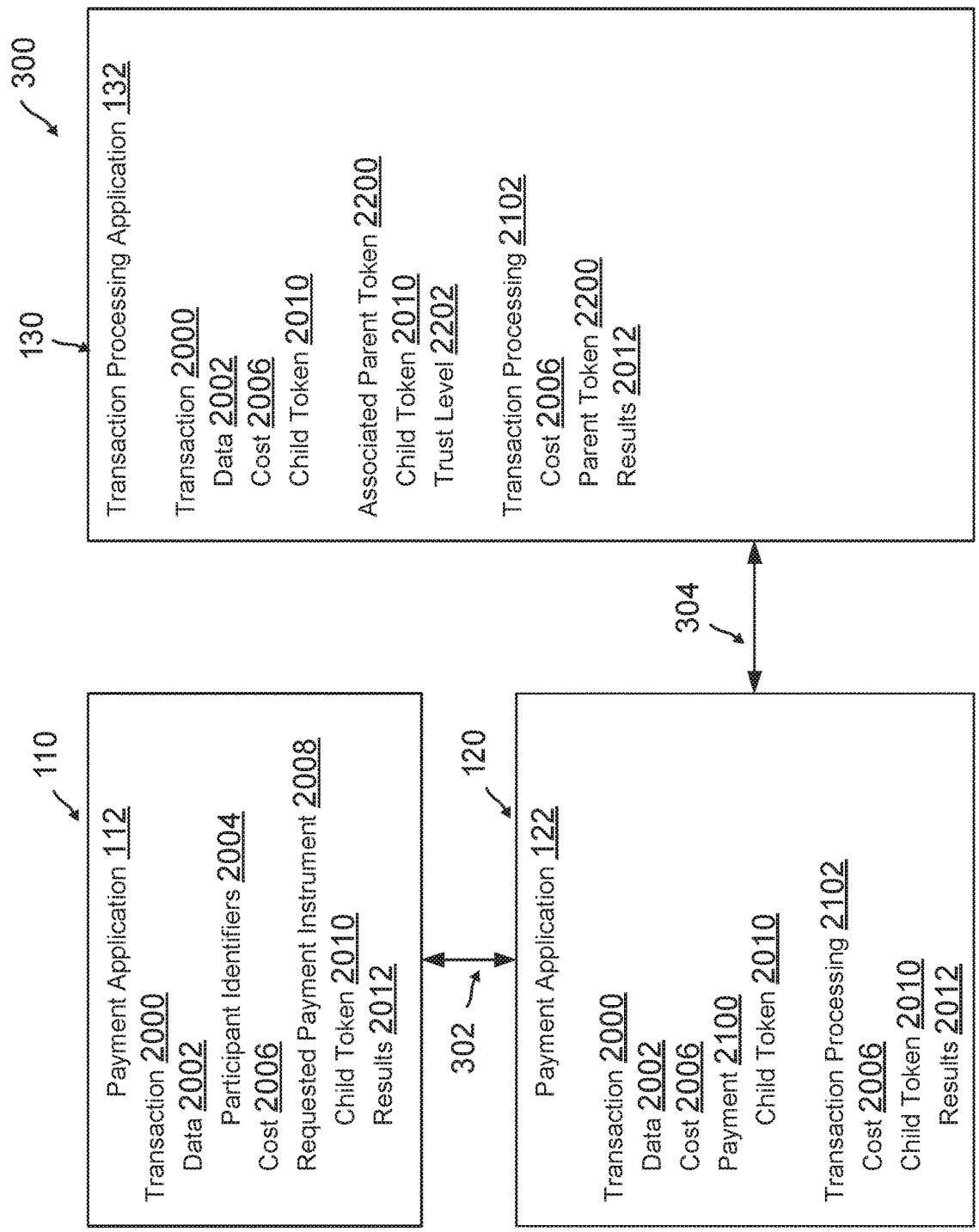
FIG. 3 is an exemplary system environment where devices may process a transaction asynchronously using child level tokens that reference a trusted parent level token, according to an embodiment.

FIG. 3 is an exemplary system environment where devices may process a transaction asynchronously using child level tokens that reference a trusted parent level token, according to an embodiment. Environment 300 of FIG. 3 includes a first user device 110, a second user device 120, and a service provider server 130 corresponding generally to the described devices and associated features found in system 100 of FIG. 1.

In environment 300, first user device 110, second user device 120, and service provider server 130 may execute modules and processes described in reference to FIG. 1. In this regard, first user device 110 may later execute payment application 112 after receipt of one or more child tokens, as discussed in environment 300 of FIG. 3. First user device 110 may be used to process a transaction 2000 having data 20002. Data 2002 for transaction 2000 may include item information and/or identifiers for items necessary to process transaction 2000. Additionally, data 2002 may also include participant identifiers 2004 that allows identification of second user device 120 and/or the user associated with second user device 120 that is required for transaction processing. Transaction 2000 may also include a cost 2006 that may be resolved using a requested payment instrument 2008. After issuance of child token 2010, child token 2010 may be accessible from a database of first user device 110 and may be used to authorize transactions between first user device 110 and second user device in an asynchronous manner without being required to request issuance of a token from a token service provider during transaction processing.

First user device 110 may then communicate some or all of transaction 2000 processed by payment application 112 to second user device 120 through communications 302. Communications 302 may be exchanged over a network or may be exchanged over short range wireless communications, such as Bluetooth or near field communications (NFC). Communications 302 may allow for transaction resolution of transaction 2000 using child token 2010 without requiring a token service provider to tokenize requested payment instrument 2008 during transaction processing. Second user device 120 executes payment application 122 to receive data necessary to process transaction 2000, including child token 2010. Payment application 122 may immediately authorize transaction 2000, for example, by displaying a transaction approval or authorization notification based on the trust determination for issuance of child token 2010. Payment application 122 may also communicate with service provider server 130 through communications 304 to resolve transaction processing for transaction 2000 using child token 2010. For example, transaction processing application 132 may receive transaction 2000 having data 2002, cost 2006 and a payment 2100 though child token 2010.

Transaction processing application 132 may determine an associated parent token 2200 using child token 2010. Once determined, a trust level 2202 may be accessed for parent token 2200, where trust level 2202 may designate the allowed transaction processing using parent token 2200. Transaction processing 2102 of transaction 2000 may be performed, and cost 2006 may be processed to an account associated with a user for second user device 120 using parent token 2200. In some embodiments, validity of transaction 2000 may be determined by transaction processing application 132 and/or one or more rules may be accessed and processed to determine whether parent token 2200 may be used for transaction processing 2102. Results 2012 may be provided to first user device 110 and second user device 120 for transaction 2000 so that payment application 112 and payment application 122 may display results 2012 for transaction processing 2102.

Figure 4:
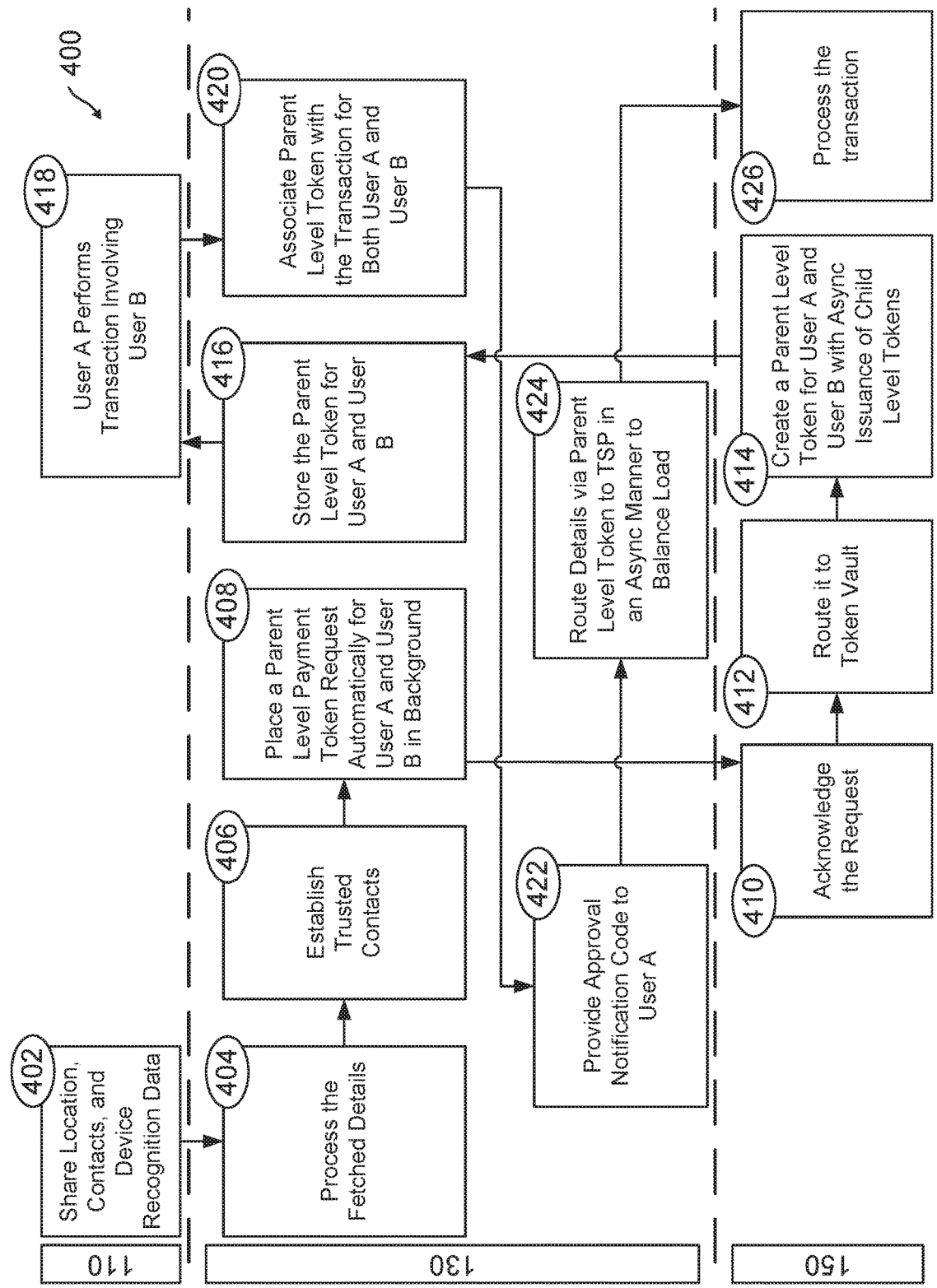
FIG. 4 is an exemplary process flowchart for parent level token issuance for asynchronous data processing based on device trust levels, according to an embodiment.

FIG. 4 is an exemplary process flowchart for parent level token issuance for asynchronous data processing based on device trust levels, according to an embodiment. Note that one or more steps, processes, and methods of flowchart 400 described herein may be omitted, performed in a different sequence, or combined as desired or appropriate.

At step 402 of flowchart 400, first user device 110 shares location, contact, and device recognition data. Additionally, first user device 110 may also share additional data necessary to determine a trust score, such as messages, social networking data, transaction histories, and other information to determine whether first user device 110 is connected to any other users and may be trusted to interact and process transactions with the other user(s) in an asynchronous manner without requiring a token service provider to tokenize data at the time of the transaction. This may be shared with service provider server 130, which may process the data fetched by service provider server, at step 404. In some embodiments, service provider server 130 may also fetch the data from other online resources, including messaging and social networking platforms, transaction processors, and other resources that devices may use to interact with other devices. The fetched data may also be stored by service provider server 130, such as account data for an account provided and managed by service provider server 130.

At step 406, service provider server 130 determines trusted contacts for the user associated with first user device 110 using the fetched data processed at step 404. Determining trusted contacts may include determining a trust score based on risk of transaction processing between the users using a parent level static and stored token without availing token service provider 150 for tokenization of data. The trust score may designate one or more of the contacts as trusted for transaction processing using the parent level token issued to one or more of the users (e.g., the user associated with first user device 110 and one the user's trusted contacts) and stored by service provider server 130. Additionally, the trusted contacts may be determined by calculating the score and comparing the score to a threshold required to be a trusted contact of the user. Once trusted contacts are determined for the user, at step 408, a parent level payment token request is placed by service provider server 130 with token service provider 150 in a background operation and automatically for the users, such as a user A associated with first user device 110 and a user B (e.g., a user associated with second user device 120 in system 100 of FIG. 1). Service provider server 130 may request issuance of the parent level token prior to transaction processing between user A and user B, for example, when server and/or network resources (e.g., bandwidth, processing availability, etc.) are available and network communications may be used to receive and store the parent level token that tokenizes transaction processing information between user A and user B.

Once the parent level token request is issued to token service provider 150 by service provider server 130, token service provider acknowledges the request, at step 410. The request may be acknowledged to generate and/or issue a token. At step 412, token service provider 150 routes the request to a token vault for token service provider 150. The token vault may be used for issuance of the token by providing token data that corresponds to a randomized number or other string that does not reveal sensitive information. At step 414, a parent level token corresponding to the static and shared token is created by the token vault and issued for users A and B. During the creation and issuance of the parent level token, one or more child level tokens may also be created using the parent level token, such as by adding one or more additional characters or numbers to the parent level token or issuing the child level token having additional or different versioning. The child level tokens may be issued asynchronously to first user device 110 and any other devices that may wish to interact with first user device based on the trust level determined for users A and B. At step 416, the parent token is stored by the service provider server 130. Additionally, service provider server 130 and/or token service provider 150 may provide the child level tokens to the devices for processing.

At step 418, user A may perform a transaction involving user B on first user device 110. The transaction may be generated having transaction data, and first user device 110 may be used to select the previously generated token that allows transaction processing without requiring issuance of a token from token service provider 150. For example, the child level token may be designated in data and/or the parent level token may be selected from data stored with service provider server 130. First user device 110 may transmit the transaction data to service provider server 130, where service provider server 130 then associates the parent level token with a transaction between users A and B without availing discreet tokens from token service provider 150 in real-time, at step 420. This allows for transaction processing using the parent level token without needing to request token issuance from token service provider 150's token vault, which may introduce additional processing, network bandwidth usage, and introduce latency.

Service provider server 130 may provide an approval notification code to user A through first user device 110 immediately using the parent level token without requiring tokenization of sensitive data due to the trust relationship and issued parent level token, at step 422. An approval code may be provided without requiring traditional transaction processing through data tokenization so that first user device 110 may receive results without token service provider 150 being required to be availed for a token. At step 424, the transaction details are routed to token service provider 150 is an asynchronous manner to perform load balancing by service provider server 130 after providing the approval code and notification. Thus, service provider server 130 may resolve transaction processing using the parent level token without having token service provider 150 issue a token. Instead, token service provider 150 may asynchronously process the transaction using the transaction details and parent level token received from token service provider 150, at step 426. This occurs after issuance of the approval notification code and therefore does not require token service provider 150 to issue a token and process the transaction with service provider server 130 during steps 418, 420, and 422.

Figure 5:
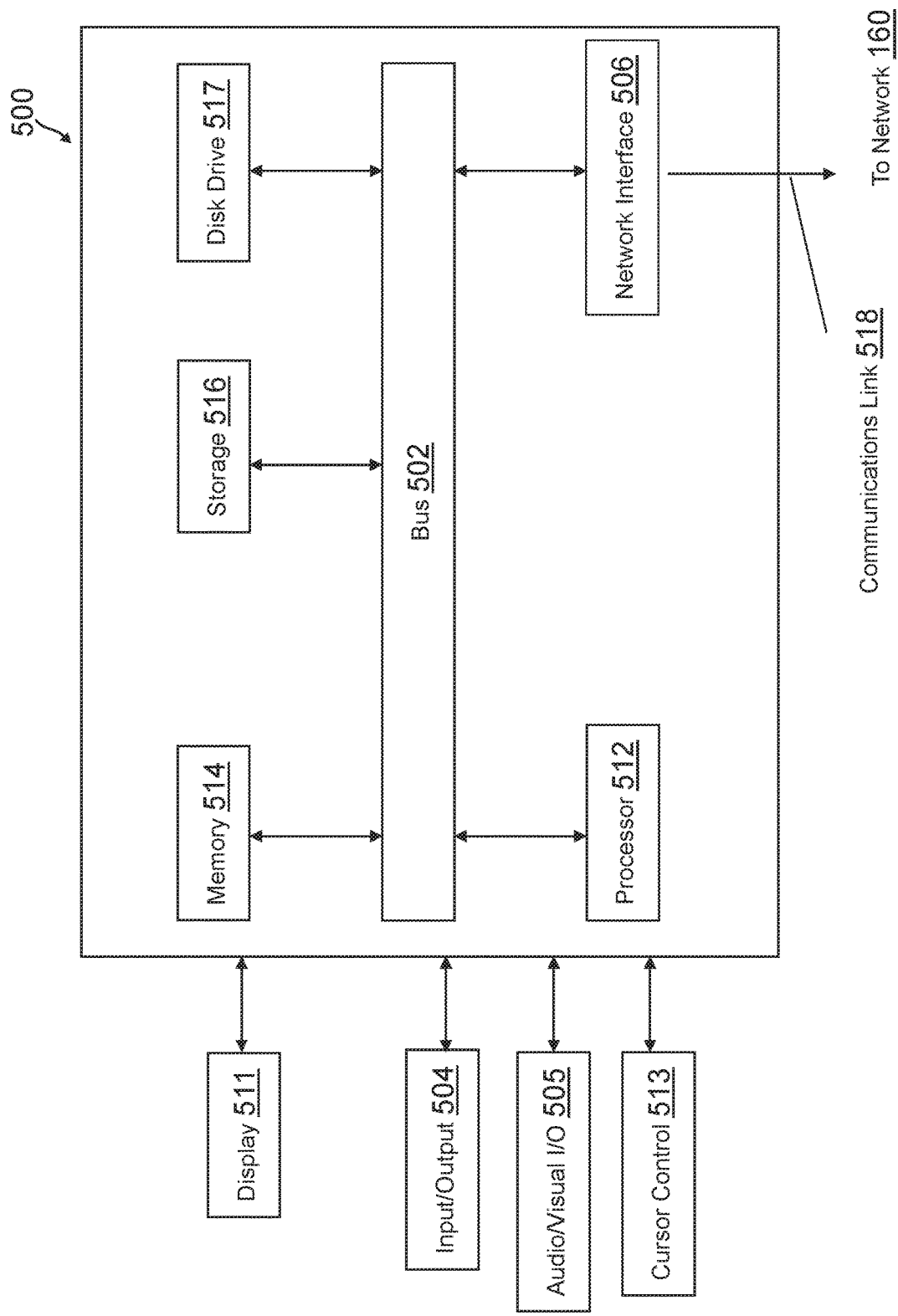
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing a first level token associated with a first device and a second device, wherein the first level token authenticates the first device and the second device for transaction processing between the first device and the second device; and
    one or more hardware processors coupled to the non-transitory memory, the non-transitory memory containing instructions, which, when executed by the one or more hardwre processor, causes the one or more hardware processor to perform operations comprising:
        monitoring, via a transaction processing application of the system, data communicated between the first device and the second device;
        based on the monitored data, determining, by the transaction processing application, a trust score that authenticates the first device and the second device for the transaction processing;
        requesting, by a network interface component of the system and from a token service provider, the first level token based on the determining the trust score:
        receiving, via the network interface component by the transaction processing application from the token service provider, the first level token asynchronously from the transaction processing between the first device and the second device;
        storing, by the transaction processing application in the non-transitory memory, the first level token;
        creating, at the system by the transaction processing application, a second level token from the first level token;
        transmitting, by the transaction processing application, the second level token to the first device;
        receiving, by the transaction processing application from the first device asynchronously after a transaction between the first device and the second device, transaction data comprising the second level token for the transaction;
        determining, by the transaction processing application, that the second level token for the transaction corresponds to the first level token;
        accessing, by the transaction processing application from the non-transitory memory, the first level token based on the deterrrining that the second level token corresponds to the first level token;
        transmitting, by the transaction processing application, an approval notification for the transaction to the first device based on the first level token authenticating the first device and the second device for the transaction processing; and
        processing, by the transaction processing application, the transaction using the first level token.

2. The system of claim 1, wherein the determining the trust score associated with authenticating the first device and the second device for the transaction processing occurs independent of the token service provider issuing a token during the transaction processing.

3. The system of claim 2, wherein the requesting the first level token from the token service provider is further based on the trust score exceeding a predetermined threshold.

4. The system of claim 2, wherein the trust score is based on at least one of a previous transaction between the first device and the second device, a shared location between the first device and the second device, or a message between the first device and the second device.

5. The system of claim 2, wherein the monitoring the data comprises:
    receiving device data from at least one of the first device or the second device, wherein the device data comprises at least one of a device location of the at least one of the first device or the second device, a contact list on the at least one of the first device or the second device, or device recognition data for the at least one of the first device or the second device,
    wherein the trust score is determined based on the device data.

6. The system of claim 1, wherein the first level token is requested by the system without user input from the first device and the second device, and wherein the processing the transaction using the first level token comprises processing the transaction with a token service provider at a time after the processing the transaction and the transmitting the approval notification.

7. The system of claim 1, wherein the second level token comprises data that identifies to the second device that the first device is authenticated for the transaction processing with the second device.

8. The system of claim 1, wherein the operations further comprise:
    determining that the transaction complies with a limitation set for the first level token for the transaction processing between the first device and the second device, wherein the approval notification is transmitted in response to determining that the transaction complies with the limitation set.

9. The system of claim 8, wherein the operations further comprise:
    determining the limitation on a use of the first level token for the transaction processing based on a business rule associated with risk prevention for the system.

10. The system of claim 1, wherein the operations further comprise:
    validating the transaction for the transaction processing based on the transaction data, wherein the approval notification is transmitted in response to validating the transaction for the transaction processing.

11. The system of claim 1, wherein the processing the transaction using the first level token comprises:
    authorizing the transaction based on receiving the second level token prior to communicating with a token service provider associated with the first level token; and
    processing the transaction using the first level token and the token service provider after authorizing the transaction.

12. A method comprising:
    monitoring, via a transaction processing application, data communicated between a first device and a second device;
    based on the monitored data, determining, by the transaction processing application, a trust score that authenticates the first device and the second device for transaction processing between the first device and the second device;
    requesting, by the transaction processing application via a network interface component and from a token service provider, a first level token based on the determining the trust score:
    receiving, via the network interface component by the transaction processing application from the token service provider the first level token asynchronously from the transaction processing between the first device and the second device, wherein the first level token authenticates the first device and the second device for the transaction processing between the first device and the second device;

storing, by the transaction processing application in a non-transitory memory, the first level token;

creating, by the transaction processing application, a second level token from the first level token;

transmitting, by the transaction processing application, the second level token to the first device, receiving, from a first device, transaction data for a transaction between the first device and a second device;

determining, by the transaction processing application, that the second level token for the transaction corresponds to the first level token;

accessing, by the transaction processing application from the non-transitory memory, the first level token based on the determining that the second level token corresponds to the first level token;

transmitting, by the transaction processing application, an approval notification for the transaction to the first device based on the first level token authenticating the first device and the second device for the transaction processing; and processing, by the transaction processing application, the transaction using the first level token.

13. The method of claim 12, wherein the determining the trust score associated with authenticating the first device and the second device for the transaction processing occurs independent of the token service provider issuing a token during the transaction processing.

14. The method of claim 13, wherein the the first level token from the token service provider is further based on the trust score exceeding a predeterrrined threshold.

15. The method of claim 13, wherein the trust score is based on at least one of a previous transaction between the first device and the second device, a shared location between the first device and the second device, or a message between the first device and the second device.

16. The method of claim 13, wherein the monitoring the data comprises:
receiving device data from at least one of the first device or the second device, wherein the device data comprises at least one of a device location of the at least one of the first device or the second device, a contact list on the at least one of the first device or the second device, or device recognition data for the at least one of the first device or the second device,
wherein the trust score is determined based on the device data.

17. The method of claim 12, wherein the first level token is requested without user input from the first device and the second device, and wherein the processing the transaction using the first level token comprises processing the transaction with a token service provider at a time after the processing the transaction and the transmitting the approval notification.

18. The method of claim 12, wherein the second level token comprises data that identifies to the second device that the first device is authenticated for the transaction processing with the second device.

19. The method of claim 12, further comprising:
determining that the transaction complies with a limitation set for the first level token for the transaction processing between the first device and the second device, wherein the approval notification is transmitted in response to determining that the transaction complies with the limitation set.

20. A non-transitory machine-readable medium having stored thereon machine-readable instructions executable to cause a machine to perform operations comprising:
monitoring, via a transaction processing application, data communicated between a first device and a second device;

based on the monitored data, determining, by the transaction processing application, a trust score that authenticates the first device and the second device for transaction processing between the first device and the second device;

requesting, by the transaction processing application via a network interface component and from a token service provider, a first level token based on the determining the trust score;

receiving, via the netw orkinterf ace component by the transaction processing application from the token service provider the first level token asynchronously from the transaction processing between the first device and the second device, wherein the first level token authenticates the first device and the second device for the transaction processing between the first device and the second device;

storing, by the transaction processing application in a non-transitory memory, the first level token;

creating, by the transaction processing application, a second level token from the first level token;

transmitting, by the transaction processing application, the second level token to the first device, receiving, from a first device, transaction data for a transaction between the first device and a second device;

determining, by the transaction processing application, that the second level token for the transaction corresponds to the first level token;

accessing, by the transaction processing application from the non-transitory memory, the first level token based on the determining that the second level token corresponds to the first level token;

transmitting, by the transaction processing application, an approval notification for the transaction to the first device based on the first level token authenticating the first device and the second device for the transaction processing; and processing, by the transaction processing application, the transaction using the first level token.

* * * * *

UNITED STATES PATENT AND TRADEMARK OFFICE
CERTIFICATE OF CORRECTION

PATENT NO. : 11,263,621 B2
APPLICATION NO. : 16/234414
DATED : March 1, 2022
INVENTOR(S) : Pankaj Sarin Page 1 of 1

It is certified that error appears in the above-identified patent and that said Letters Patent is hereby corrected as shown below:

In the Claims

In Claim 1, Column 19, Line 14, change "hardwre" to --hardware--

In Claim 1, Column 19, Line 48, change "deterrrining" to --determining--

In Claim 14, Column 21, Line 36, change "predeterrrined" to --predetermined--

In Claim 20, Column 22, Line 27, change "netw orkinterf ace" to --network interface--

Signed and Sealed this
Seventh Day of June, 2022

Katherine Kelly Vidal
*Director of the United States Patent and Trademark Office*